(12) United States Patent
Ogawa (10) Patent No.: US 11,370,040 B2
(45) Date of Patent: Jun. 28, 2022

(54) ROTARY TOOL AND METHOD FOR MANUFACTURING MACHINED PRODUCT

(71) Applicant: KYOCERA Corporation, Kyoto (JP)

(72) Inventor: Hiroshi Ogawa, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 2 days.

(21) Appl. No.: 16/478,147

(22) PCT Filed: Jan. 26, 2018

(86) PCT No.: PCT/JP2018/002504
§ 371 (c)(1),
(2) Date: Jul. 16, 2019

(87) PCT Pub. No.: WO2018/139585
PCT Pub. Date: Aug. 2, 2018

(65) Prior Publication Data
US 2019/0366449 A1    Dec. 5, 2019

(30) Foreign Application Priority Data

Jan. 27, 2017 (JP) .............................. JP2017-013040

(51) Int. Cl.
*B23B 51/08* (2006.01)
*B23B 51/10* (2006.01)
(Continued)

(52) U.S. Cl.
CPC ............ *B23B 51/108* (2013.01); *B23B 51/00* (2013.01); *B23B 51/009* (2013.01); *B23B 51/08* (2013.01); *B23C 5/10* (2013.01); *B23D 77/00* (2013.01)

(58) Field of Classification Search
CPC . B23B 51/00; B23B 2251/282; B23B 51/108; B23B 51/009; B23B 51/02;
(Continued)

(56) References Cited

U.S. PATENT DOCUMENTS

| 1,747,117 A | 4/1927 | Klein |
| 4,936,721 A * | 6/1990 | Meyer ..................... B23B 51/08 408/224 |

(Continued)

FOREIGN PATENT DOCUMENTS

| FR | 902101 A * | 8/1945 | ............. B23B 51/08 |
| JP | 2-501207 A | 4/1990 | |

(Continued)

*Primary Examiner* — Eric A. Gates
*Assistant Examiner* — Paul M Janeski
(74) *Attorney, Agent, or Firm* — Volpe Koenig (57) ABSTRACT

A rotary tool according to a non-limiting aspect has a body that has a rod shape extending from a first end to a second end and is rotatable about a central axis. The body has a first cutting edge positioned on the first end, a first flute extending from the first cutting edge toward the second end, a second cutting edge being on a side of the second end and on a side of an outer periphery with respect to the first cutting edge and being positioned away from the first cutting edge, and a second flute, extending from the second cutting edge toward the second end and being positioned along the first flute. The second flute has a projecting portion extending from a side of the first end toward a side of the second end.

19 Claims, 10 Drawing Sheets

(51) Int. Cl.
    *B23B 51/00*    (2006.01)
    *B23C 5/10*     (2006.01)
    *B23D 77/00*    (2006.01)

(58) Field of Classification Search
    CPC ....... B23B 51/10; B23B 51/105; B23B 51/08;
              B23C 5/10; B23C 2210/40; B23D 77/00;
                            B23D 77/12; Y10T 408/906
    See application file for complete search history.

(56) References Cited

U.S. PATENT DOCUMENTS 5,160,232 A      11/1992  Maier
5,282,705 A  *    2/1994  Shiga ..................... B23B 51/00
                                                         408/211

FOREIGN PATENT DOCUMENTS

| JP | 06-031517 A   |   | 2/1994  |
|----|---------------|---|---------|
| JP | 6-091416 A    |   | 4/1994  |
| JP | 07040116 A    | * | 2/1995  |
| JP | 07195215 A    | * | 8/1995  |
| JP | 2001-105216 A |   | 4/2001  |
| JP | 2003-334709 A |   | 11/2003 |
| JP | 2011-110655 A |   | 6/2011  |

* cited by examiner

ROTARY TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/002504 filed on Jan. 26, 2018, which claims priority to Japanese Application No. 2017-013040 filed on Jan. 27, 2017, which are entirely incorporated herein by reference.

TECHNICAL FIELD

An aspect relates to a rotary tool used in machining and a method for manufacturing a machined product.

BACKGROUND ART

As a machining tool used for milling processing being an example of machining, a rotary tool such as a drill, an end mill, and a reamer is known. With regard to the above-described rotary tool, as described in, for example, JP 6-31517 A (Patent Document 1) and JP 2001-105216 A (Patent Document 2), a so-called stepped rotary tool including a cutting edge having a small diameter and positioned on a side of a tip end and a cutting edge having a large diameter and positioned on a side of a rear end is suggested.

The stepped rotary tool as described in Patent Document 1 and Patent Document 2 has two cutting edges in a stepped manner, and thus chips are generated at each of the cutting edges. In a case where the chips generated at the cutting edge positioned on the side of the tip end flow through a discharge flute, when the chips generated at the cutting edge positioned on the side of the rear end of the discharge flute suddenly flow in, the chips generated at the respective cutting edges get entangled, and there may be a risk of causing chip clogging. Thus, the stepped rotary tool has a problem to improve a chip discharge performance. An aspect has been made in view of the above-described problem, and an object of the aspect is to provide a rotary tool having a satisfactory chip discharge performance.

SUMMARY OF INVENTION

A rotary tool according to a non-limiting aspect has a body that has a rod shape extending from a first end to a second end and is rotatable about a central axis. The body has a first cutting edge positioned on a side of the first end, a first flute extending from the first cutting edge toward the second end, a second cutting edge positioned on a side of the second end away from the first cutting edge and being positioned on a side of an outer periphery with respect to the first cutting edge, and a second flute extending from the second cutting edge toward the second end and positioned along the first flute. The second flute has a projecting portion extending from a side of the first end toward a side of the second end.

DESCRIPTION OF EMBODIMENTS

Drill

Hereinafter, as an example of a rotary tool 1 of non-limiting embodiments, description may be given by exemplifying a drill 1. Note that in addition to the drill, examples of the rotary tool may include an end mill and a reamer. Accordingly, there is no problem even when another embodiment of the rotary tool is, for example, an end mill. In addition, an example of the drill 1 of the non-limiting embodiments may be a so-called solid-type drill, but there is no problem when the drill is of a tip-end exchange type.

For convenience of description, each of the figures referred to below may illustrate in a simplified manner main members of members constituting non-limiting embodiments. Accordingly, the rotary tool of the present disclosure can have any constituent member that is not illustrated in each of the figures referred to. In addition, dimensions of members in each of the figures do not faithfully represent actual dimensions of the constituent members, dimension ratios of the members, or the like.

Figure 1:
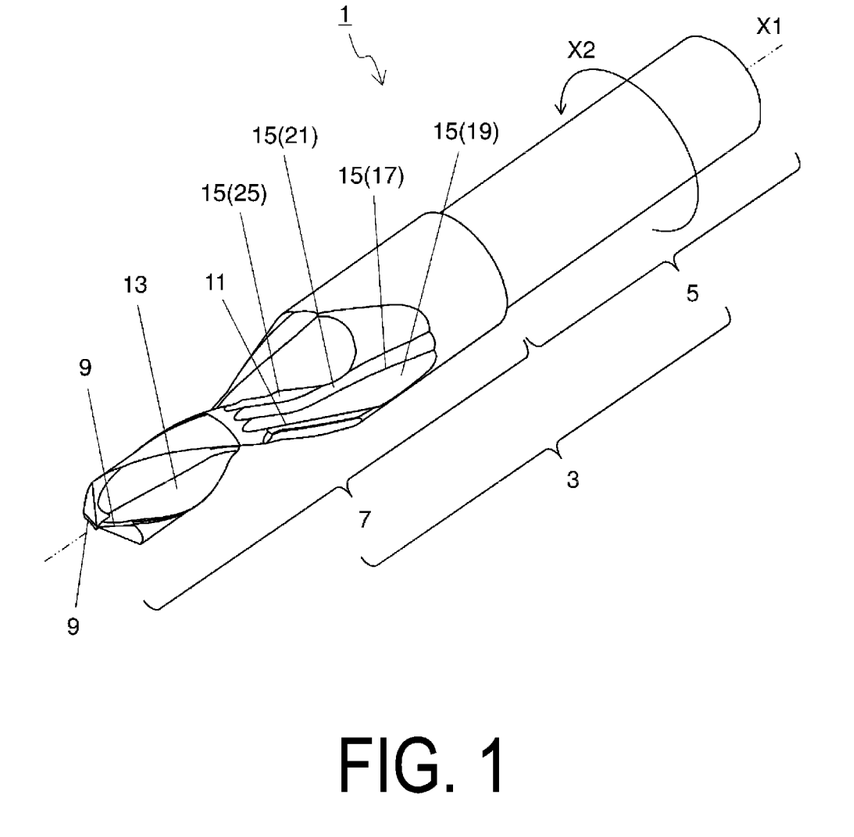
FIG. 1 is a perspective view illustrating a rotary tool (drill) of a non-limiting embodiment.
Figure 2:
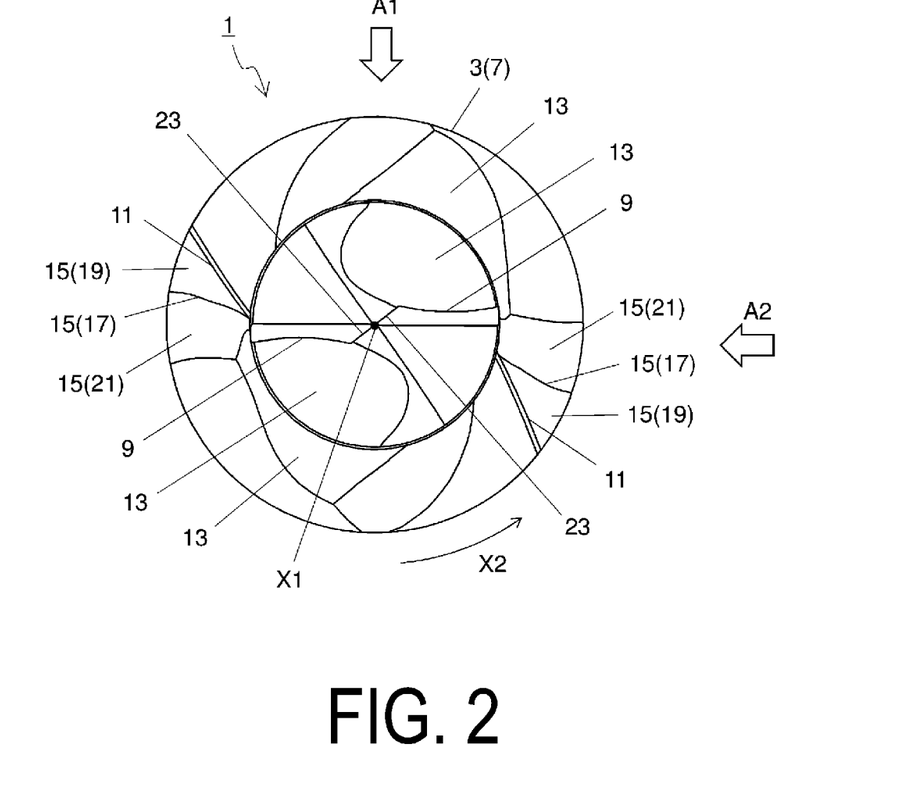
FIG. 2 is a front view from a tip end direction of the drill illustrated in FIG. 1.

As illustrated in FIG. 1 and the like, the drill 1 of the non-limiting embodiments may have a body 3 that has a rod shape extending along a central axis X1 from a first end to a second end. The body 3 may be rotatable about the central axis X1, and may be capable of rotating about the central axis X1 at a step of machining a workpiece to manufacture a machined product. Note that an arrow X2 in FIG. 1 and the like may indicate a rotational direction of the body 3. Thus, the central axis X1 in the non-limiting embodiments may be regarded as a rotation axis.

Hereinafter, for convenience sake, one side in a direction along the central axis X1 may be indicated as a "first end," and another side in the direction along the central axis X1 may be indicated as a "second end." In general, the first end may be referred to as a "tip end," and the second end may be referred to as a "rear end."

The body 3 may have a gripped portion 5 called a shank and a cutting portion 7 called a body. The gripped portion 5 in the example illustrated in FIG. 1 may be a portion gripped by a spindle or the like of a machine tool (not illustrated). Thus, a shape of the gripped portion 5 may be designed in accordance with a shape of the spindle. The cutting portion 7 in the example illustrated in FIG. 1 may be positioned on the side of the first end with respect to the gripped portion 5. The cutting portion 7 may be a portion that comes into contact with a workpiece and may be a portion that plays a main role in machining a workpiece.

As illustrated in FIG. 1 and the like, the cutting portion 7 in the non-limiting embodiments may have a first cutting edge 9 positioned on the side of the first end and a second cutting edge 11 being on the side of the second end away from the first cutting edge 9 and being positioned on a side of an outer periphery with respect to the first cutting edge 9. The drill 1 of the non-limiting embodiments may have the first cutting edge 9 and the second cutting edge 11 described above, and may be a configuration called stepped drill.

The first cutting edge 9 positioned on the first end of the body 3 may extend on the central axis X1 or may extend from the vicinity of the central axis X1 to an outer peripheral surface of the body 3. Only one first cutting edge 9 may be provided or a plurality of the first cutting edges 9 may be provided. The body 3 in the non-limiting embodiments may have two first cutting edges 9. Each first cutting edge 9 may be a blade that plays a main role in machining a workpiece, and may be generally called a main cutting edge.

The second cutting edge 11 being positioned on the side of the second end away from the first cutting edge 9 may be positioned on the side of the outer periphery with respect to the first cutting edge 9. In this case, it may be only necessary that at least a portion of the second cutting edge 11 be positioned on the side of the outer periphery with respect to the first cutting edge 9, and it may be not necessary that the second cutting edge 11 be entirely positioned on the side of the outer periphery of the body 3 with respect to the first cutting edge 9.

As with the first cutting edge 9, only one second cutting edge 11 may be provided or a plurality of the second cutting edges 11 may be provided. The second cutting edge 11 can be used as a finishing blade for finishing a machined surface of a workpiece in machining the workpiece. Note that, application of the second cutting edge 11 is not limited to the finishing blade, and the second cutting edge 11 may be used for, for example, forming a tapered surface at an opening portion of a machined hole in drilling.

In addition to the first cutting edge 9 and the second cutting edge 11 described above, the body 3 may have a first flute 13 extending from the first cutting edge 9 toward the second end and a second flute 15 extending from the second cutting edge 11 toward the second end. The second flute 15 may be positioned along the first flute 13. The first flute 13 and the second flute 15 can be used in discharging chips generated at the first cutting edge 9 and the second cutting edge 11 to the outside, and may be generally called chip discharge flutes. To grip the body 3 stably by a machine tool, the first flute 13 and the second flute 15 in the non-limiting embodiments may be provided only in the cutting portion 7 of the body 3, and may not be provided in the gripped portion 5.

The first flute 13 may have, for example, a shape extending straight along the central axis X1 from the side of the first end toward the side of the second end. However, the first flute 13 in the example illustrated in FIG. 1 may have a shape extending spirally about the central axis X1 toward the second end of the body 3. The second flute 15 may be positioned along the first flute 13, and thus in the example illustrated in FIG. 1, the second flute 15 also may have a shape extending spirally about the central axis X1.

The second flute 15 in the non-limiting embodiments may have a projecting portion 17 extending from the side of the first end toward the side of the second end. The projecting portion 17 may be positioned along a direction in which the second flute 15 extends. In the example illustrated in FIG. 1, the second flute 15 may have a shape extending spirally about the central axis X1. Thus, the projecting portion 17 also may have a shape extending spirally about the central axis X1. In a case where the projecting portion 17 extends along the first flute 13, the projecting portion 17 may cause chips generated at the second cutting edge 11 to be less likely to flow in the first flute 13.

In the rotary tool 1 of the non-limiting embodiments, the second flute 15 may have the projecting portion 17 described above, and thus a flow of chips generated at the second cutting edge 11 may be likely to be controlled by the projecting portion 17 as compared to a case where the second flute 15 has a simple recessed shape. Thus, a possibility in that the chips flow in the first flute 13 lowers. In addition, even when chips generated at the second cutting edge 11 climb over the projecting portion 17 and flow in the first flute 13, a sudden flow of the chips generated at the second cutting edge 11 may be suppressed by the projecting portion 17. Thus, the chips generated at the second cutting edge 11 may be prevented from suddenly flowing in the first flute 13. Accordingly, a possibility of the chips generated at the first cutting edge 9 and chips generated at the second cutting edge 11 getting entangled may be lowered, and thus a chip discharge performance may be satisfactory.

The second flute 15 in the non-limiting embodiments may have a first region 19 extending from the second cutting edge 11 toward the second end, and a second region 21 positioned frontward in a rotational direction with respect to the first region 19. In an example illustrated in FIG. 3, the second region 21 may be adjacent to the first region 19 frontward in the rotational direction. Then, the projecting portion 17 may be a boundary between the first region 19 and the second region 21.

Figure 3:
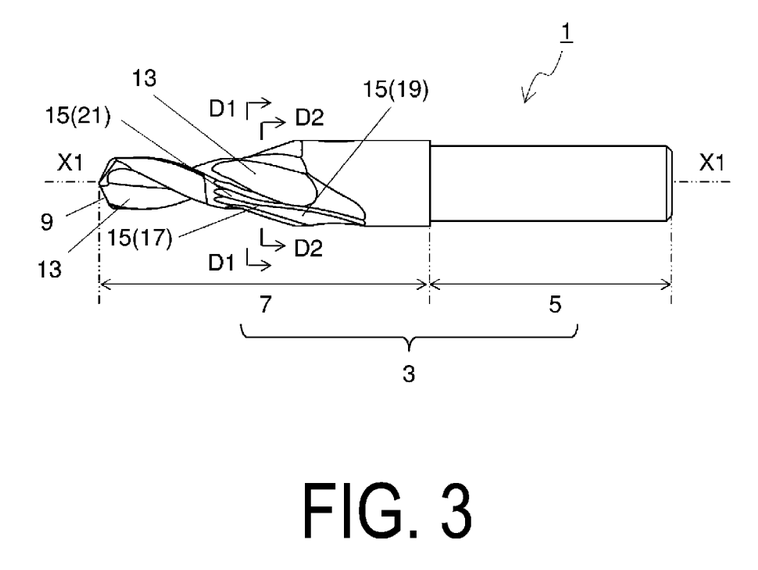
FIG. 3 is a side view from a direction A1 of the drill illustrated in FIG. 2.

In a case where the second flute 15 has the first region 19 and the second region 21 disposed in parallel and the projecting portion 17 is positioned at the boundary between those regions, the projecting portion 17 can be formed easily at a step of forming the second flute 15.

At a cross-section orthogonal to the central axis X1, each of the first region 19 and the second region 21 may have a recessed shape. Specifically, at the cross-section orthogonal to the central axis X1, each of the first region 19 and the second region 21 may have a recessed curve shape. Each of the first region 19 and the second region 21 is not limited to have a specific shape, but a depth d1 of the first region 19 may be greater than a depth d2 of the second region 21, for example.

In the case where the depths of the first region 19 and the second region 21 are configured as described above, a possibility of causing chip clogging may be further lowered. This is because when chips generated at the second cutting edge 11 flow in the second flute 15, the chips may be likely to flow stably in the first region 19. The first region 19 may be away from the first flute 13 through intermediation of the second region 21, and thus chips generated at the second cutting edge 11 may be less likely to flow in the first flute 13. Thus, a risk of causing chip clogging may be further lowered.

Figure 6:
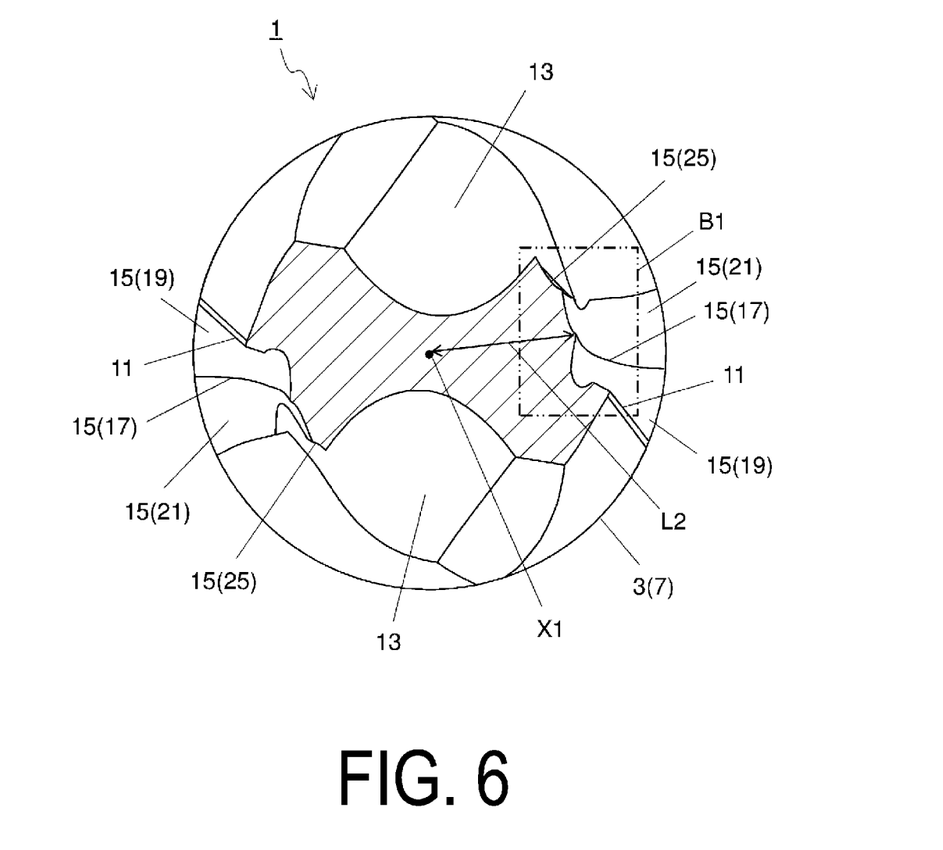
FIG. 6 is a cross-sectional view at D2 of the drill illustrated in FIG. 3.
Figure 7:
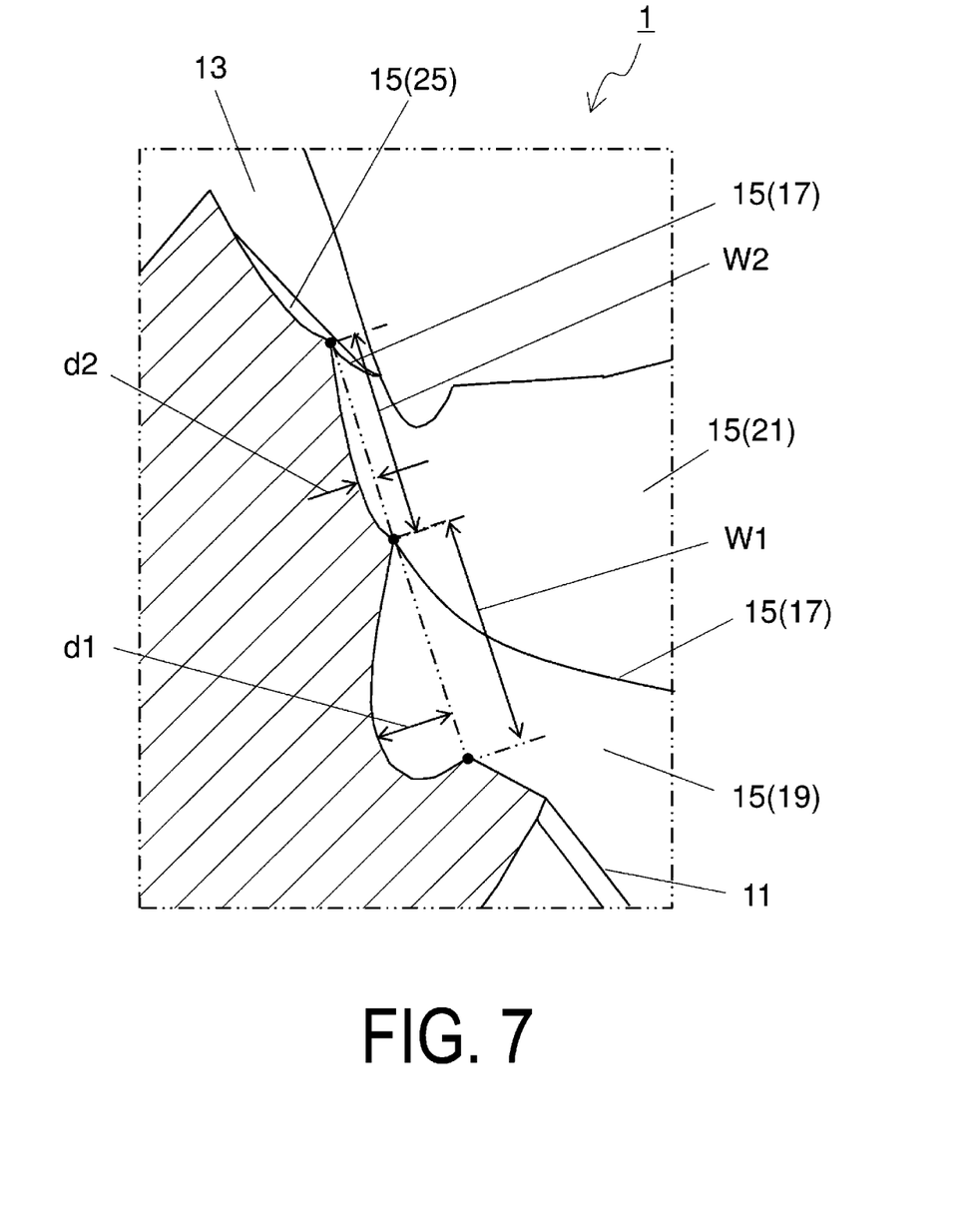
FIG. 7 is an enlarged view of a region B1 of the drill illustrated in FIG. 6.

The depths of the first region 19 and the second region 21 can be evaluated by the following procedure. First, as illustrated in FIG. 6, at the cross-section orthogonal to the central axis X1, the first region 19 and the second region 21 may be specified. Hereinafter, the depth d1 of the first region 19 will be described. As illustrated in FIG. 7, in the first region 19 having a recessed shape, an end frontward in the rotational direction and an end rearward in the rotational direction may be specified. When those ends are connected by an imaginary straight line, a length of the imaginary straight line may correspond to a width W1 of the first region

19. A portion of the first region 19 being farthest from the imaginary straight line may be a bottom of the first region 19, and a width from the above-described imaginary straight line to the bottom of the first region 19 may correspond to the depth d1 of the first region 19. The procedure of evaluating the depth d1 of the first region 19 is described above, and a width W2 of the second region 21 and the depth d2 of the second region 21 can be evaluated in a similar manner.

The first region 19 in the non-limiting embodiments may extend from the side of the first end to the side of the second end. In this case, as illustrated in FIG. 4, the first region 19 may have a first part 19a having a constant width and a second part 19b positioned on the side of the second end with respect to the first part 19a and having a width that increases as approaching the second end.

In the case where the first region 19 has the above-described configuration, chips generated at the second cutting edge 11 may be likely to be discharged stably to the outside by the second flute 15. Chips generated at the second cutting edge 11 and flowing to the first region 19 may advance to the first part 19a at first. In this case, when the width of the first part 19a is constant, the chips may be likely to advance in a direction in which the first region 19 extends, instead of the direction toward the first flute 13.

Chips generated at the second cutting edge 11 may have a greater length as advancing on the first region 19, and thus an advancing direction may be likely to be unstable. However, in a case where chips advancing on the first region 19 pass through the first part 19a and flow in the second part 19b, the second part 19b may have a configuration in which the width of the second part 19b increases as approaching the second end, and thus, the above-described chips may be less likely to deviate from the second part 19b and may be less likely to flow in the first flute 13. As a result, chips generated at the second cutting edge 11 may be likely to be discharged stably at the second flute 15.

Figure 4:
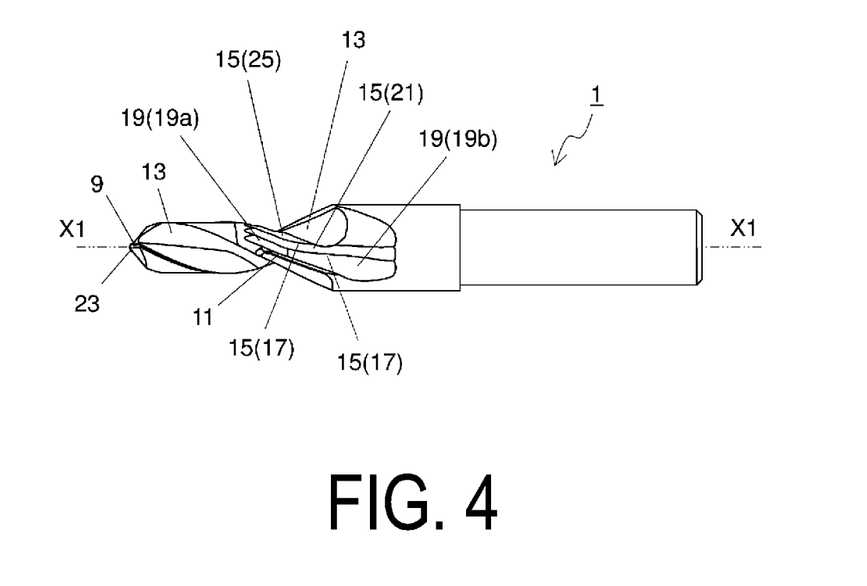
FIG. 4 is a side view from a direction A2 of the drill illustrated in FIG. 2.

As illustrated in FIG. 4, the first part 19a in the first region 19 having a constant width can be substantially evaluated when the body 3 is viewed from a side in a direction of viewing the end of the first region 19 on the side of the first end from the front. More accurately, the first part 19a can be evaluated by illustrating an expansion plan of an outer periphery of the body 3. The expansion plan of the outer periphery of the body 3 can be obtained by processing an image in which the outer periphery of the body 3 is captured.

In addition, the projecting portion 17 in the non-limiting embodiments may have a region having a distance from the central axis X1 that increases as approaching the side of the second end from the side of the first end. In the non-limiting embodiments, of two cross-sections, a distance L2 from the central axis X1 of the projecting portion 17 positioned on the side of the second end in FIG. 6 may be greater than a distance L1 from the central axis X1 of the projecting portion 17 positioned on the side of the first end in FIG. 5. Thus, the projecting portion 17 may have a region having an increased distance from the central axis X1 in at least a portion of the portion sandwiched between the two cross-sections.

Figure 5:
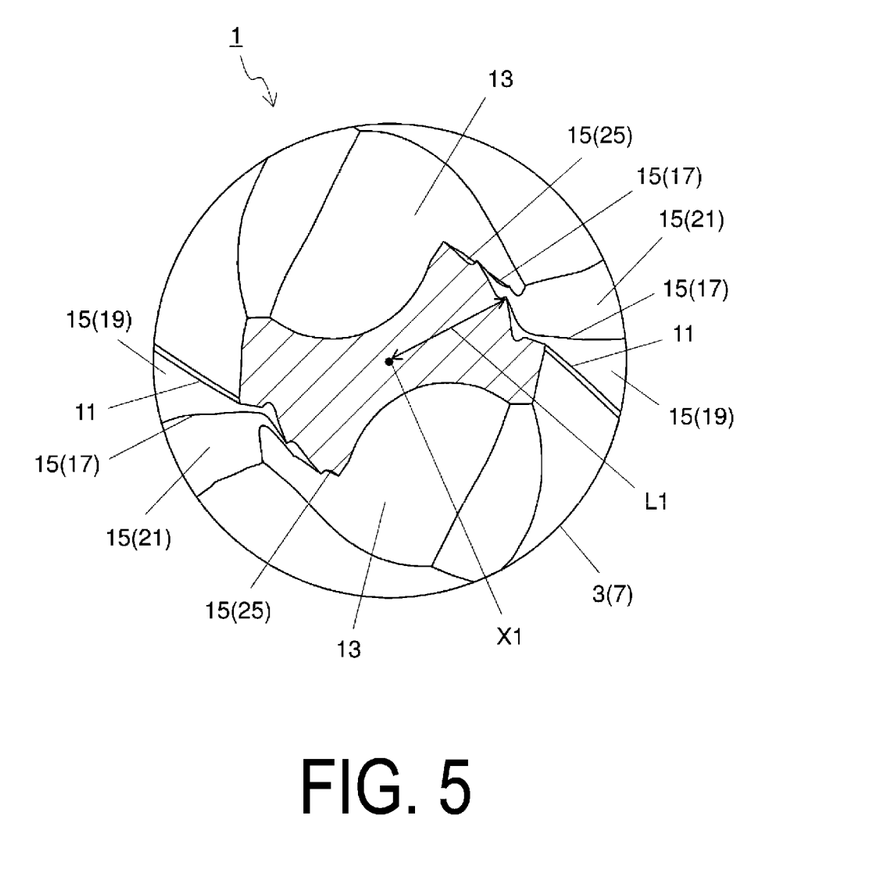
FIG. 5 is a cross-sectional view at D1 of the drill illustrated in FIG. 3.

In the case where the projecting portion 17 has the region described above, a depth of the second flute 15 may be great on the side of the first end of the second flute 15, and a height of the projecting portion 17 may be also great on the side of the second end of the second flute 15. Thus, chips generated at the second cutting edge 11 may be less likely to flow in the first flute 13.

The body 3 of the non-limiting embodiments may have a third cutting edge 23 as a cutting edge in addition to the first cutting edge 9 and the second cutting edge 11. The third cutting edge 23 may be positioned at the first end of the body 3, and passes the central axis X1 in a front view from the side of the first end. The two first cutting edges 9 may be connected to the third cutting edge 23, and may be connected to each other through the third cutting edge 23. The third cutting edge 23 may be generally called a chisel edge.

The two first cutting edges 9 are not limited to a specific configuration, but may be provided at positions that are rotationally symmetrical to each other by 180 degrees about the central axis X1 in a front view from the side of the first end. When the two first cutting edges 9 are point symmetrical to each other with the central axis X1 as a reference, cutting balance of the first cutting edges 9 functioning as the main cutting edges may be satisfactory. Thus, straight-traveling stability of the drill 1 may be high.

In addition, to further improve straight-traveling stability of the drill 1, two second cutting edges 11 may also point symmetrical to each other with the central axis X1 as a reference in a front view from the side of the first end. However, the two second cutting edges 11 may not be point symmetrical to each other with the central axis X1 as a reference in a front view from the side of the first end.

In the case where the two second cutting edges 11 are not point symmetrical to each other with the central axis X1 as a reference as described above, timing at which the two second cutting edges 11 bite a workpiece can be shifted. Thus, influence of chatter vibration may be small, and thus accuracy of a machined hole in drilling may be high.

One projecting portion 17 of the body 3 may be provided or a plurality of the projecting portions 17 of the body 3 may be provided. The body 3 in the non-limiting embodiments may have the plurality of projecting portions 17. The second flute 15 in the non-limiting embodiments may have a third region 25 in addition to the first region 19 and the second region 21. The third region 25 may be adjacent to the second region 21 frontward in the rotational direction. In addition to the boundary between the first region 19 and the second region 21, a boundary between the second region 21 and the third region 25 may be also the projecting portion 17.

In the case where the body 3 has the plurality of projecting portions 17, a sudden flow of chips generated at the second cutting edge 11 may be suppressed in each of the projecting portions 17. Thus, a possibility of chips generated at the second cutting edge 11 and chips generated at the first cutting edge 9 getting entangled may be further lowered, and a chip discharge performance may be further satisfactory.

In this case, at the cross-section orthogonal to the central axis X1, when the distances from the central axis X1 to the respective plurality of projecting portions 17 are the same, a sudden flow of chips generated at the second cutting edge 11 can be suppressed efficiently in the respective plurality of projecting portions 17. Note that, when the distances from the central axis X1 to the respective plurality of projecting portions 17 are the same, it may be not required that the two distances be exactly the same. There is no problem even when there is tolerance of about ±5%.

A size of the body 3 is not limited to a specific size, but a diameter D of the body 3 may be set to, for example, from 0.05 mm to 40 mm. In addition, a length in a direction along the central axis X1 of the cutting portion 7 may be set to from about 1.5D mm to about 25D mm.

Examples of a material constituting the body 3 may include metal, hard metal, cermet, and ceramics. Examples of the metal may include stainless steel and titanium.

Examples of composition of the hard metal may include WC(tungsten carbide)-Co(Cobalt), WC—TiC(titanium carbide)-Co, WC—TiC—TaC(tantalum carbide)-Co, and WC—TiC—TaC—$Cr_3C_2$(chromium carbide)-Co. Here, WC, TiC, TaC, and $Cr_3C_2$ may be hard particles, and Co may be a bonded phase.

In addition, the cermet may be a sintered composite material obtained by combining a metal with a ceramic component. Specifically, an example of the cermet may include a material containing a titanium compound such as titanium carbide (TiC) and titanium nitride (TiN) as a main component. Examples of the ceramics may include $Al_2O_3$, $Si_3N_4$, and Cubic Boron Nitride (cBN).

The body 3 may be constituted only of the materials described above, or may be constituted of a member, constituted of the materials described above, and a cover layer covering the member. Examples of a material constituting the cover layer may include at least one selected from diamond, diamond-like carbon (DLC), TiC, TiN, TiCN, TiMN (M is at least one metal element selected from metal of the groups 4, 5, and 6 in the periodic table excluding Ti, and from Al and Si), and $Al_2O_3$.

When the body 3 has the cover layer described above, wear resistance of the cutting edges positioned on the side of the first end (the first cutting edge 9 and the third cutting edge 23 in the non-limiting embodiments) may be high. Especially, when the cover layer contains diamond, the drill 1 may exert satisfactory wear resistance even when a workpiece is of a ceramic material.

The cover layer can be formed by, for example, a vapor phase synthesis. Examples of the vapor phase synthesis may include a chemical vapor deposition (CVD) method and a physical vapor deposition (PVD) method. A thickness of the cover layer may be set to, for example, from 0.3 μm to 20 μm. Note that the suitable range may differ in accordance with composition of the cover layer.

Method for Manufacturing Machined Product

Next, a method for manufacturing a machined product of an non-limiting embodiments may be described in detail by exemplifying the case where the drill 1 according to the above-described non-limiting embodiments may be used. Hereinafter, description may be given with reference to FIG. 8 to FIG. 10. Note that in FIG. 8 to FIG. 10, a portion on the side of the second end of the gripped portion of the drill 1 may be omitted.

The method for manufacturing a machined product according to the non-limiting embodiments may have the following steps (1) to (4).

Figure 8:
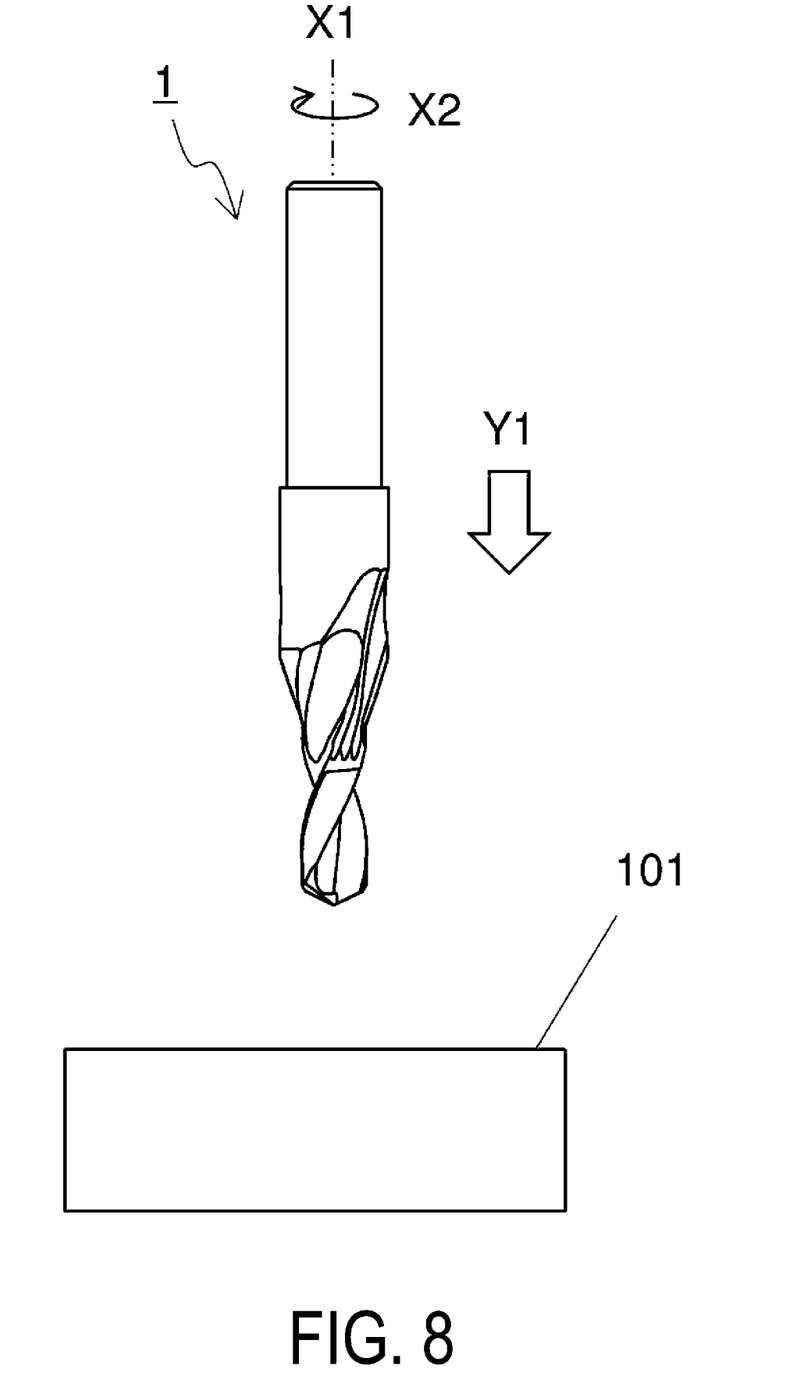
FIG. 8 is a perspective view illustrating a step in a method for manufacturing a machined product of a non-limiting embodiment.

(1) A step of disposing the drill 1 above a workpiece 101 prepared (refer to FIG. 8).

(2) A step of rotating the drill 1 in a direction of the arrow X2 about the central axis X1 and bringing the drill 1 close to the workpiece 101 in a direction Y1 (refer to FIG. 8).

This step, for example, can be performed by fixing the workpiece 101 on a table of a machine tool to which the drill 1 is installed, and bringing the drill 1 close to the workpiece 101 while rotating the drill 1. Note that, at this step, the workpiece 101 and the drill 1 may be brought relatively close to each other, or the workpiece 101 may be brought close to the drill 1.

Figure 9:
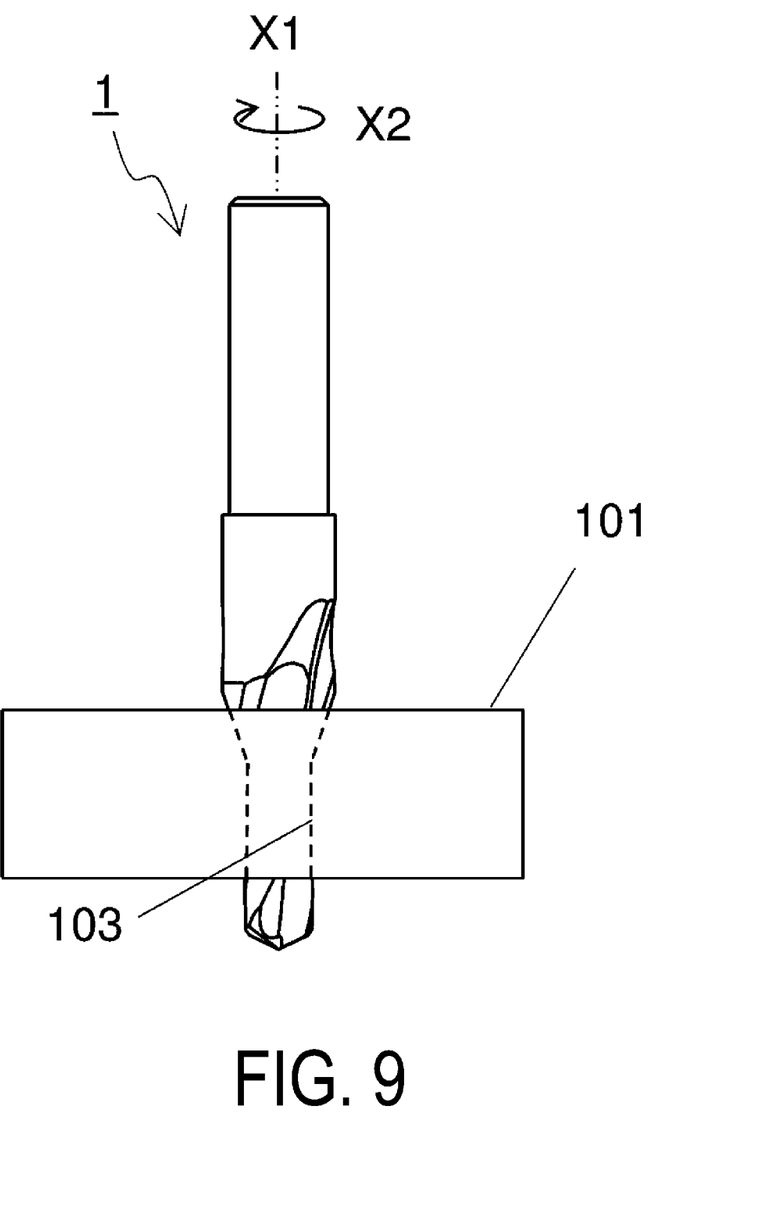
FIG. 9 is a perspective view illustrating a step in the method for manufacturing a machined product of a non-limiting embodiment.

(3) A step of bringing the drill 1 closer to the workpiece 101 and causing the drill 1 that is rotating to come into contact with a desire position on a surface of the workpiece 101 to form a machined hole 103 (through-hole) in the workpiece 101 (refer to FIG. 9).

At this step, the first cutting edge, the second cutting edge, and the third cutting edge may be caused to come into contact with a desired position on the surface of the workpiece 101. In a case where the second cutting edge is caused to come into contact only with the vicinity of an opening portion of the machined hole 103, a tapered surface can be formed at the opening portion of the machined hole 103.

Figure 10:
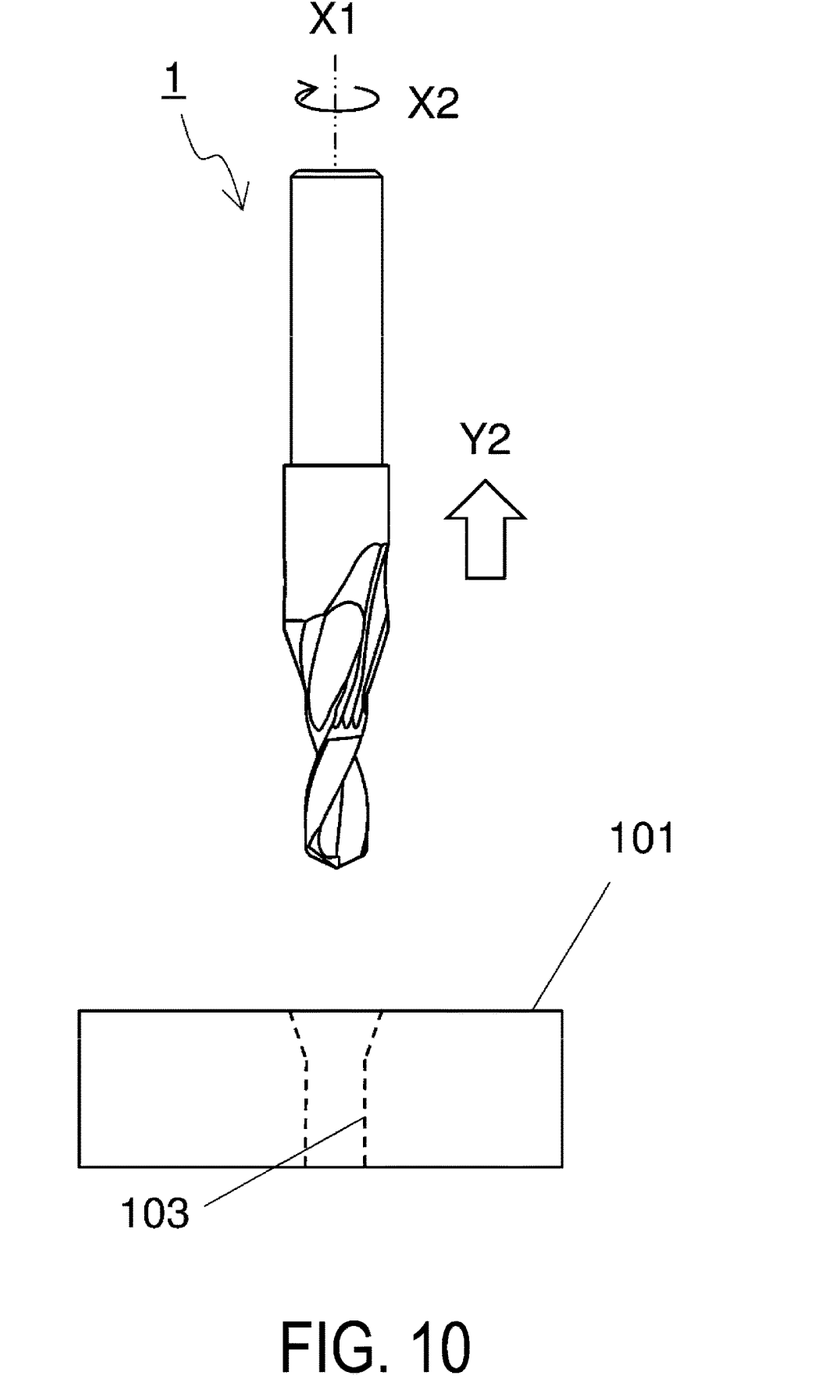
FIG. 10 is a perspective view illustrating a step in the method for manufacturing a machined product of a non-limiting embodiment.

(4) A step of separating the drill 1 from the workpiece 101 in a direction Y2 (refer to FIG. 10).

Again at this step, as with step (2) described above, the workpiece 101 and the drill 1 may be relatively separated from each other, or the workpiece 101 may be separated from the drill 1, for example.

Through the steps described above, it may be possible to exert excellent hole workability.

Note that when machining the workpiece 101 as described above may be carried out a plurality of times, and, for example, a plurality of the machined holes 103 may be formed in one workpiece 101, a step of causing the drill 1 to come into contact with a different location of the workpiece 101 while rotating the drill 1 may be repeated.

The drill 1 of the non-limiting embodiments may be exemplified above. However, the present disclosure is not limited to the non-limiting embodiments, and, needless to say, the drill can have any configuration without departing from the gist of the present disclosure.

REFERENCE SIGNS LIST

1 Rotary tool (drill)
3 Body
5 Gripped portion
7 Cutting portion
9 First cutting edge
11 Second cutting edge
13 First flute
15 Second flute
17 Projecting portion
19 First region
19a First part
19b Second part
21 Second region
23 Third cutting edge
25 Third region
101 Workpiece
103 Machined hole

The invention claimed is:

1. A rotary tool comprising a body that has a rod shape extending from a first end to a second end and is rotatable about a central axis, wherein
the body comprises:
one or more first cutting edges positioned on a side of the first end;
one or more first flutes extending from the first cutting edges toward the second end;
one or more second cutting edges positioned on a side of the second end away from the first cutting edges and positioned on a side of an outer periphery of the body with respect to the first cutting edges; and
one or more second flutes extending from the second cutting edges toward the second end and positioned along the first flutes, and
at least one of the second flutes comprise a projecting portion extending from a side of the first end toward a side of the second end, the projecting portion is located inward of the outer periphery of the body at a cross-section orthogonal to the central axis, and an end portion of the projecting portion on the side of the second end is located closer to the second end than an end portion of the second cutting edge on the side of the second end.

2. The rotary tool according to claim 1, wherein
at least one of the second flutes further comprises
a first region extending from the second cutting edges toward the second end, and
a second region positioned frontward in a rotational direction with respect to the first region, and
the projecting portion is a boundary between the first region and the second region.

3. The rotary tool according to claim 2, wherein
the first region has a first depth,
the second region has a second depth, and
the first depth is greater than the second depth.

4. The rotary tool according to claim 2, wherein
the first region comprises
a first part having a first width, and
a second part closer to the second end than the first part and having a second width, and
the first width is constant and the second width increases as the second width approaches the second end.

5. The rotary tool according to claim 1, wherein the projecting portion extends along the first flutes.

6. The rotary tool according to claim 1, wherein
the projecting portion comprises a region having a first distance from the central axis, and
the first distance increases as the first distance approaches the second end.

7. The rotary tool according to claim 1, wherein
the body comprises two or more first cutting edges and two or more second cutting edges, and
the first cutting edges are point symmetrical to each other with the central axis and the second cutting edges are not point symmetrical to each other with the central axis in a front view.

8. The rotary tool according to claim 1, wherein
the body comprises two or more second flutes,
each of the second flutes comprises the projecting portion.

9. The rotary tool according to claim 8, wherein a distance from the central axis to the projecting portion located at one of the second flutes is the same a distance from the central axis to the projecting portion located at the other one of the second flutes at a cross-section orthogonal to the central axis.

10. A method for manufacturing a machined product, the method comprising:
rotating the rotary tool according to claim 1;
causing the rotary tool that is rotating to come into contact with a workpiece; and
separating the rotary tool from the workpiece.

11. A rotary tool comprising:
a body having a rod shape, extending from a first end to a second end, being rotatable about a central axis, and comprising:
one or more first cutting edges positioned on a side of the first end;
one or more first flutes extending from the first cutting edges toward the second end;
one or more second cutting edges located closer to the second end than the first cutting edges, farther from the central axis than the first cutting edge, and separated from the first cutting edges; and
one or more second flutes extending from the second cutting edges toward the second end and positioned along the first flutes, wherein
at least one of the second flutes comprise a projecting portion extending along the first flutes,
the projecting portion is located inward of an outer periphery of the body at a cross-section orthogonal to the central axis, and
an end portion of the projecting portion on a side of the second end is located closer to the second end than an end portion of the second cutting edge on the side of the second end.

12. The rotary tool according to claim 11, wherein
at least one of the second flutes further comprises
a first region extending from the second cutting edges toward the second end, and
a second region positioned frontward in a rotational direction with respect to the first region, and
the projecting portion is a boundary between the first region and the second region.

13. The rotary tool according to claim 12, wherein
the first region has a first depth,
the second region has a second depth, and
the first depth is greater than the second depth.

14. The rotary tool according to claim 12, wherein
the first region comprises
a first part having a first width, and
a second part closer to the second end than the first part and having a second width, and
the first width is constant and the second width increases as the second width approaches the second end.

15. The rotary tool according to claim 11, wherein
the projecting portion comprises a region having a first distance from the central axis, and
the first distance increases as the first distance approaches the second end.

16. The rotary tool according to claim 11, wherein
the body comprises two or more first cutting edges and two or more second cutting edges, and
the first cutting edges are point symmetrical to each other with the central axis and the second cutting edges are not point symmetrical to each other with the central axis in a front view.

17. The rotary tool according to claim 11, wherein
the body comprises two or more second flutes,
each of the second flutes comprises the projecting portion.

18. The rotary tool according to claim 17, wherein a distance from the central axis to the projecting portion located at one of the second flutes is the same a distance from the central axis to the projecting portion located at the other one of the second flutes at a cross-section orthogonal to the central axis.

19. A method for manufacturing a machined product, the method comprising:
rotating the rotary tool according to claim 11;
causing the rotary tool that is rotating to come into contact with a workpiece; and
separating the rotary tool from the workpiece.

* * * * *